(12) United States Patent
Anderton et al.

(10) Patent No.: US 11,166,435 B2
(45) Date of Patent: Nov. 9, 2021

(54) METHODS AND SYSTEMS FOR DETERRING ANIMALS TO APPROACH OR ENTER IDENTIFIED ZONES

(71) Applicants: Terry Anderton, Hampton Falls, NH (US); Samuel Stoddard, Somersworth, NH (US)

(72) Inventors: Terry Anderton, Hampton Falls, NH (US); Samuel Stoddard, Somersworth, NH (US)

(73) Assignee: WAGZ, Inc., Portsmouth, NH (US)

( * ) Notice: Subject to any disclaimer, the term of this patent is extended or adjusted under 35 U.S.C. 154(b) by 0 days.

(21) Appl. No.: 16/886,352

(22) Filed: May 28, 2020

(65) Prior Publication Data

US 2020/0375149 A1 Dec. 3, 2020

Related U.S. Application Data

(60) Provisional application No. 62/853,308, filed on May 28, 2019.

(51) Int. Cl.
| | | |
|---|---|---|
| *A01K 15/02* | (2006.01) | |
| *A01K 27/00* | (2006.01) | |
| *H04W 4/80* | (2018.01) | |
| *G08B 21/02* | (2006.01) | |

(52) U.S. Cl.
CPC .......... *A01K 15/023* (2013.01); *A01K 27/009* (2013.01); *H04W 4/80* (2018.02); *G08B 21/0261* (2013.01)

(58) Field of Classification Search
CPC .. A01K 15/021; A01K 15/023; A01K 15/028; A01K 15/029; A01K 27/009; G08B 21/0277; G08B 21/0261
USPC ................................ 119/714, 715, 720, 721
See application file for complete search history.

(56) References Cited

U.S. PATENT DOCUMENTS

| | | | | |
|---|---|---|---|---|
| 4,766,847 A | * | 8/1988 | Venczel .............. | A01K 15/023 119/721 |
| 4,898,120 A | * | 2/1990 | Brose ................... | A01K 11/006 119/721 |
| 5,241,923 A | * | 9/1993 | Janning ............... | A01K 11/006 119/721 |
| 5,408,956 A | * | 4/1995 | Quigley .............. | A01K 15/023 119/720 |
| 5,533,470 A | * | 7/1996 | Rose ................... | A01K 15/003 119/721 |

(Continued)

*Primary Examiner* — Ebony E Evans
(74) *Attorney, Agent, or Firm* — Ascentage Patent Law, LLC; Travis Lee Johnson

(57) ABSTRACT

A system and method for deterring animals, such as pets, from entering, getting onto, or being in certain defined zones/locations created by a user. The pet monitoring system includes a smart collar configured to communicate with a plurality of powered transceivers/transmitters, particularly Bluetooth transmitters and transceivers. Each of the transceivers or transmitters has a unique ID associated with it. The smart collar, a smartphone or other wireless communicating device can read and record the signal strength of each of the transmitters at various locations and use that information to create prohibited zones that can be downloaded onto the smart collar. The smart collar can also contain a stimulus emitter for providing a warning to the animal and a communication device configured to alert the owner.

12 Claims, 15 Drawing Sheets

(56) References Cited

U.S. PATENT DOCUMENTS

| | | | | |
|---|---|---|---|---|
| 6,232,916 B1* | 5/2001 | Grillo | A01K 15/023 | 342/357.4 |
| 6,431,122 B1* | 8/2002 | Westrick | A01K 15/023 | 119/721 |
| 6,657,544 B2* | 12/2003 | Barry | A01K 15/023 | 119/721 |
| 6,963,301 B2* | 11/2005 | Schantz | G01S 5/14 | 342/118 |
| 8,342,135 B2* | 1/2013 | Peinetti | A01K 15/023 | 119/721 |
| 8,692,676 B2* | 4/2014 | Touchton | A01K 15/04 | 340/573.3 |
| 9,070,275 B1* | 6/2015 | Green | F16P 3/147 | |
| 9,551,781 B2* | 1/2017 | Baxley | G06K 9/00771 | |
| 10,645,908 B2* | 5/2020 | Seltzer | A01K 29/005 | |
| 10,863,718 B1* | 12/2020 | Lazarevic | A01K 27/009 | |
| 2009/0102668 A1* | 4/2009 | Thompson | A01K 15/023 | 340/573.3 |
| 2009/0289844 A1* | 11/2009 | Palsgrave | A01K 15/021 | 342/357.55 |
| 2013/0239904 A1* | 9/2013 | Kim | A01K 15/023 | 119/719 |
| 2013/0239905 A1* | 9/2013 | Kim | A01K 15/023 | 119/720 |
| 2014/0283758 A1* | 9/2014 | Cho | A01K 15/021 | 119/720 |
| 2015/0373951 A1* | 12/2015 | Kelly | A01K 15/023 | 119/719 |
| 2017/0265432 A1* | 9/2017 | Anderton | G01S 5/02 | |
| 2018/0160652 A1* | 6/2018 | Torres | H04W 4/021 | |
| 2018/0184618 A1* | 7/2018 | Gotts | H04L 67/18 | |

\* cited by examiner

INTENSITY

| | 20A | 20B |
|---|---|---|
| A | 9 | 2 |
| B | 7 | 5 |
| C | 3 | 10 |
| D | 2 | 10 |
| E | 3 | 9 |
| F | 5 | 7 |
| G | 9 | 3 |
| H | 10 | 1 |

FIG. 8B

INTENSITY

| | 20A | 20B | 20C |
|---|---|---|---|
| AA | 7 | 2 | 1 |
| BB | 7 | 5 | 3 |
| CC | 3 | 10 | 5 |
| DD | 1 | 10 | 5 |
| EE | 2 | 8 | 10 |
| FF | 5 | 8 | 10 |
| GG | 9 | 4 | 6 |
| HH | 10 | 1 | 2 |

FIG. 9B

METHODS AND SYSTEMS FOR DETERRING ANIMALS TO APPROACH OR ENTER IDENTIFIED ZONES

This application claims priority from U.S. Provisional Appl. No. 62/853,308, filed on May 28, 2019, the contents of which are incorporated herein in their entirety.

FIELD OF THE INVENTION

The present invention relates generally to preventing animals, such as pets, from entering, getting onto, or being in certain defined zones created by a user.

BACKGROUND OF THE INVENTION

Several mechanisms and systems exist to prevent animals from entering or leaving a particular area. Many of these include utilizing a pet collar that has a stimulus mechanism, which is triggered when the animal wearing the collar enters into a restricted area. Some systems included using RFID tags that can be placed on certain items, which when registered by the collar, can provide the aforementioned stimulus as a means for training or deterring the pet wearing the collar from being near a restricted area or on a restricted piece of furniture.

One of the downsides of using RFID is that the animal (or technically the collar) has to get really close to the RFID chip for it to register. Another downside, is that to increase the effective reach of the RFID chip and reader (on the collar) a lot of power has to be utilized for the signal to travel more than a couple of inches. Smart Pet Collars, like most smart devices, operate off of rechargeable batteries and thus have a limited resource of power before being required to be recharged. This high-power consumption event, renders this kind of solution to be unworkable, or one that comes with the sacrifice having a larger battery, giving up other power consumption features or forcing the user to charge the collar frequently. Again, these are really untenable solutions.

An example of a smart collar can be found in U.S. Patent Application Publication No. 2017-0265432, the entirety of which is incorporated by reference herein.

The present application seeks to overcome these and other deficiencies in order to improve upon creating restricted zones using low power consumption techniques that are effective and accurate.

SUMMARY

It is desirable to have a system and a method for preventing animals, such as pets, from entering, getting onto, or being in certain defined zones created by a user. Accordingly, the present application relates to systems and methods for defining zones such as animal restricted zones.

In some embodiments, an animal restricted zone system includes an animal-borne smart collar and a plurality of powered transceivers. Each of the plurality of powered transceivers has a unique identification location, a location, and are configured to emit a signal. The smart collar includes a non-transitory computer-readable medium containing a set of computer-implemented instructions, a first set of processing circuitry operatively connected to the non-transitory computer-readable medium, the processing circuitry being configured to implement the first set of computer instructions, a wireless transceiver, a stimulus emitter, and a power source. The collar is configured to receive multiple emitted signals simultaneously and determine the signal strength of each signal. The processing circuitry is configured to determine a distance relative to a pre-determined warning or prohibited zone based on the signal strength of each signal associated with the plurality of powered transceivers. The plurality of powered transceivers may include a Bluetooth transceiver or a WIFI transceiver.

In some embodiments, a method of establishing an animal restricted zone includes placing a first emitter at a first location at or a near a portion of an animal restricted zone. A second emitter is placed at a second location at or a near a portion of the animal restricted zone, and the first location is different than the second location. A wireless communication device is utilized to establish a perimeter around the animal restricted zone, and the established perimeter is uploaded to a smart collar.

In at least one embodiment, the method includes placing a third emitter at a third location at or a near a portion of the animal restricted zone and the third location is different than the first location and the second location.

In at least one embodiment, the method includes creating an identified zone name for the animal restricted zone and inputting a unique identification associated with each of the first emitter and the second emitter.

In at least one embodiment, the method includes creating a table with the signal strength of each emitter along various points along a perimeter of the animal restricted zone.

In at least one embodiment, the perimeter is established by moving the wireless transceiver about a desired perimeter of the desired animal restricted zone and recording signal strength of each emitter at various points along the desired perimeter.

In some embodiments, an animal restricted zone system includes an animal-borne smart collar and at least two Bluetooth emitters. Each of the Bluetooth emitters has a unique identification location, a location, and are configured to emit a signal. The smart collar includes a non-transitory computer-readable medium containing a set of computer-implemented instructions, a first set of processing circuitry operatively connected to the non-transitory computer-readable medium, the processing circuitry being configured to implement the first set of computer instructions, a wireless transceiver, a stimulus emitter, and a power source. The collar is configured to receive multiple emitted signals simultaneously and determine the signal strength of each signal. The processing circuitry is configured to determine a distance relative to a pre-determined warning or prohibited zone based on the signal strength of each signal associated with the plurality of powered transceivers. The plurality of powered transceivers may include a Bluetooth transceiver or a WIFI transceiver.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A-B illustrate mapping points along a prohibited zone in a table showing the intensity or signal strength of individual emitters;

FIGS. 9A-B illustrate mapping points along a prohibited zone in a table showing the intensity or signal strength of individual emitters;

DETAILED DESCRIPTION OF THE INVENTION

Figure 1:
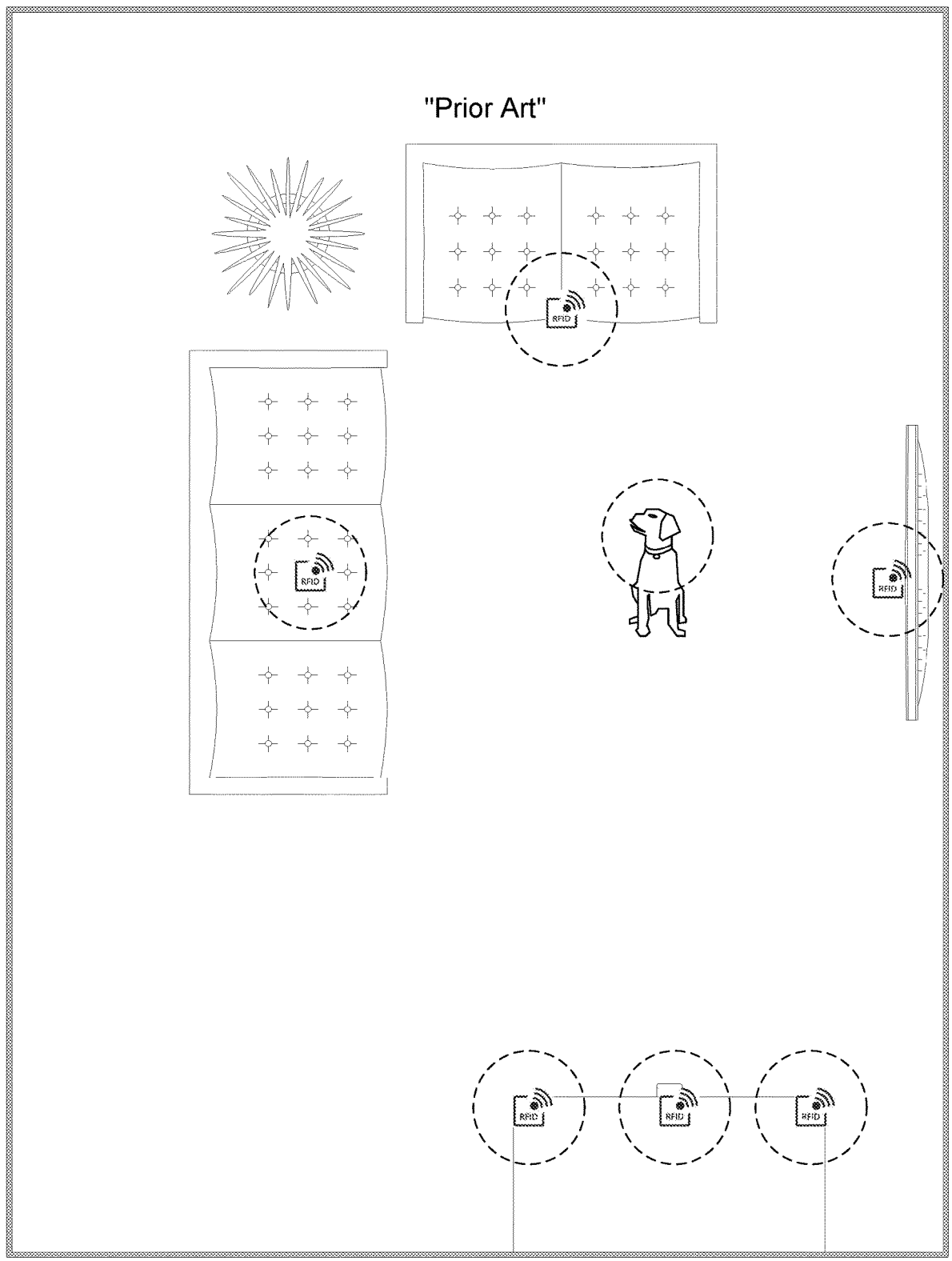
FIG. 1 illustrates prior art solutions for zone prevention.

As noted above, the prior art uses RFID chips and readers to determine forbidden zones for animals—see U.S. Pat. No. 8,917,172. FIG. 1 is an illustration meant to convey the shortcomings of a system such as that in patent '172. For example, read range for typical low power RFID tags is several inches and up to a foot. Extended ranges can be achieved, but not without battery assisted RFID tags and a high-power reader, which consumes more energy. One of the potential solutions for solving the drain on the limited battery power in a collar was to use a motion harvesting system. This works if the animal is active, but even motion harvesting systems require significant amounts of motion to create even small amounts of energy. As shown in FIG. 1, the ranges associated with reading RFID tags are very limited and, in any case, may not completely cover the desired zone.

Figure 2:
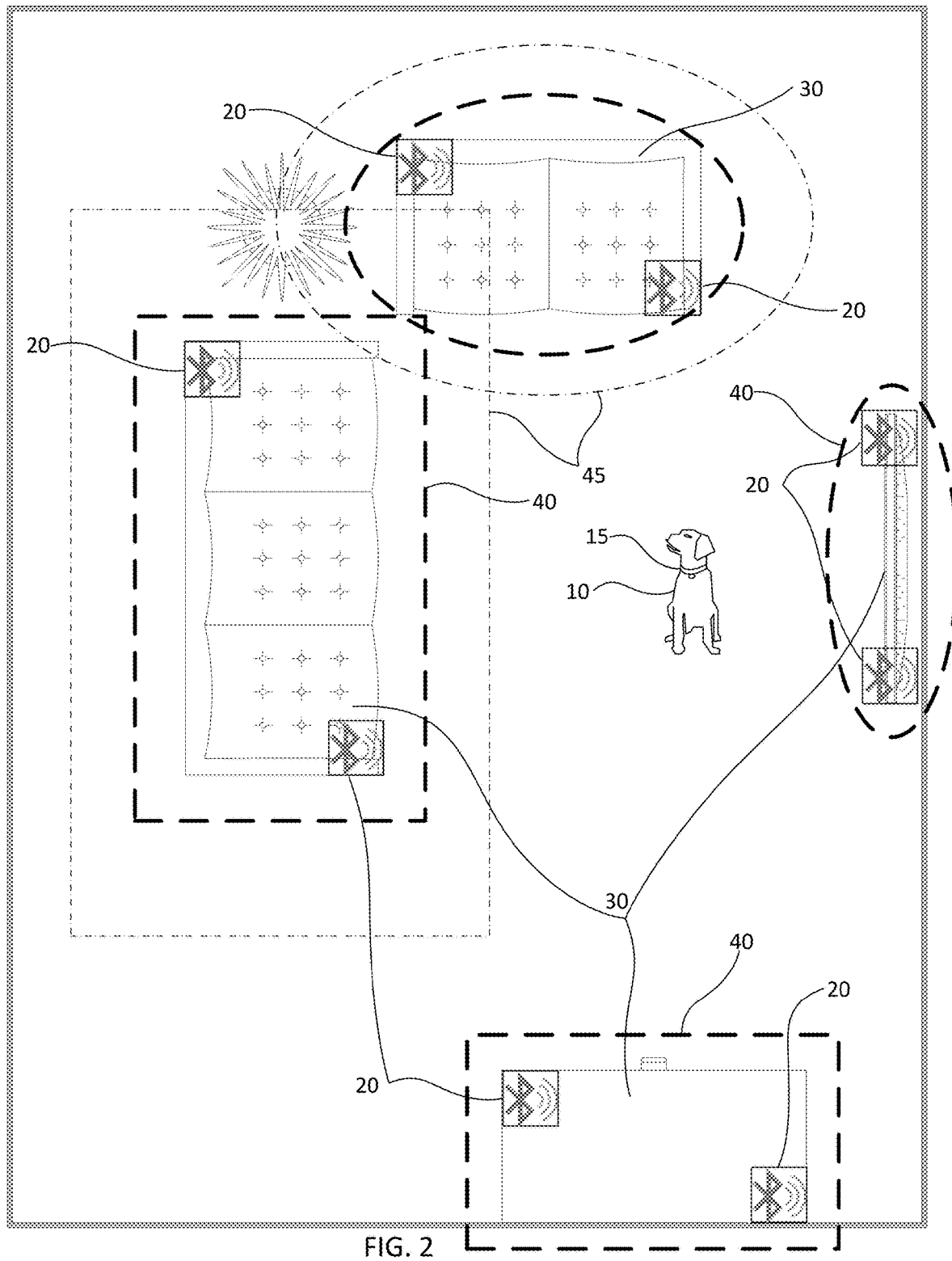
FIG. 2 illustrates an exemplary schematic of a location-based pet training system illustrative of various inventive concepts thereof.

FIGS. 2-5 illustrate exemplary embodiments utilizing an improved system for keeping and training to keep animals away from prohibited zones. As illustrated in FIG. 2, multiple Bluetooth transmitters 20 can be attached to various portions of furniture 30 or areas where a desired prohibited zone 40 (and/or warning zone 45) is to be created. In this configuration and other configurations, the Bluetooth tiles are shown being placed inside the prohibited zone; however, it is to be understood that the Bluetooth transmitters can be placed outside of the prohibited zone and still function correctly, which will become clearer below.

The zones that are created can take on multiple geographic shapes. For example, rectangular zones are created around a number of pieces of furniture, while an oval or circular shaped zone is created around another piece of furniture. As will become apparent below, the increased number of emitters helps with the accuracy and defining of the zone shape. As the animal wearing the smart collar enters the warning zone, certain indicators including lights, sounds, vibrations and other mechanisms associated with the smart collar or communicating with the smart collar can be utilized. A notice to the animal's owner can also be received. Additional lights, sounds, vibrations and other stimuli used for training animals can be triggered if the animal enters into the prohibited zone and persist until the animal leaves the prohibited zone 40, after which the stimuli can stop. These stimuli are well-known in the art for training animals.

Figure 3:
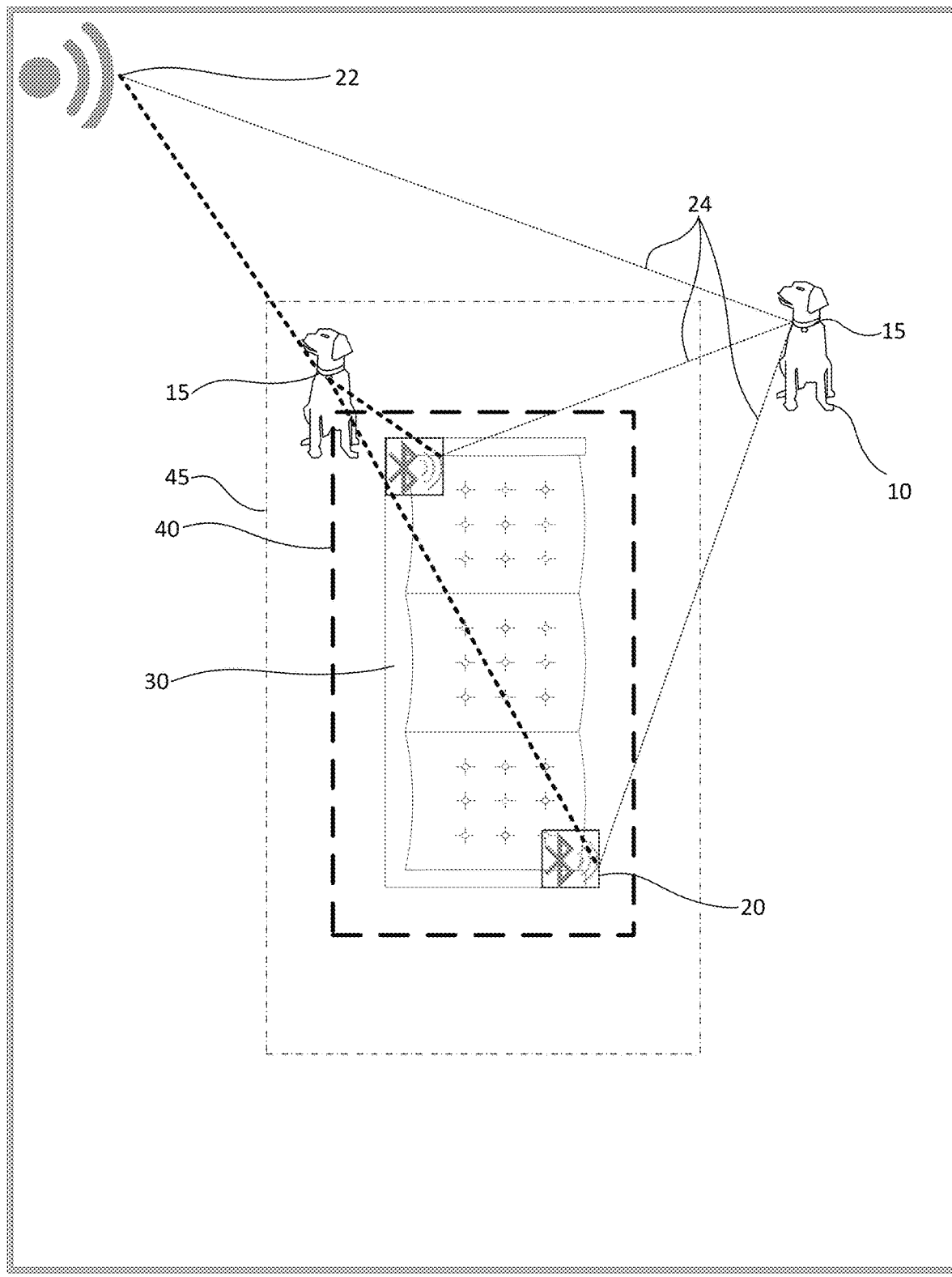
FIG. 3 illustrates an embodiment of utilizing Bluetooth and WIFI signals to help determine warning and prohibited zones to the smart collar.

FIG. 3 illustrates a couple examples where a combination of WIFI and Bluetooth transmitter signals 24 are received by the collar to determine whether or not the animal has entered into one of the zones. As shown, by having 3 signals, even varying types of signals, the processor and memory on the collar utilizing formulaic software instructions can calculate whether or not the animal has entered into one of the zones and trigger as mentioned above appropriate reminders, notifications and/or stimuli. Often in houses or other indoor places equipment, such as WIFI routers 22 or repeaters, emitting WIFI signals are limited in the number per room or as often the case one router can cover multiple rooms, as WIFI signals can emit over a longer range. One advantage of utilizing multiple signals to determine prohibited zones is that a single signal often has to be centered within the prohibited zone, and thus it can be difficult to truly design an ideal prohibited zone. At the very least a zone that has a non-circular shape is difficult if not impossible to make with a single emitter.

Figure 4:
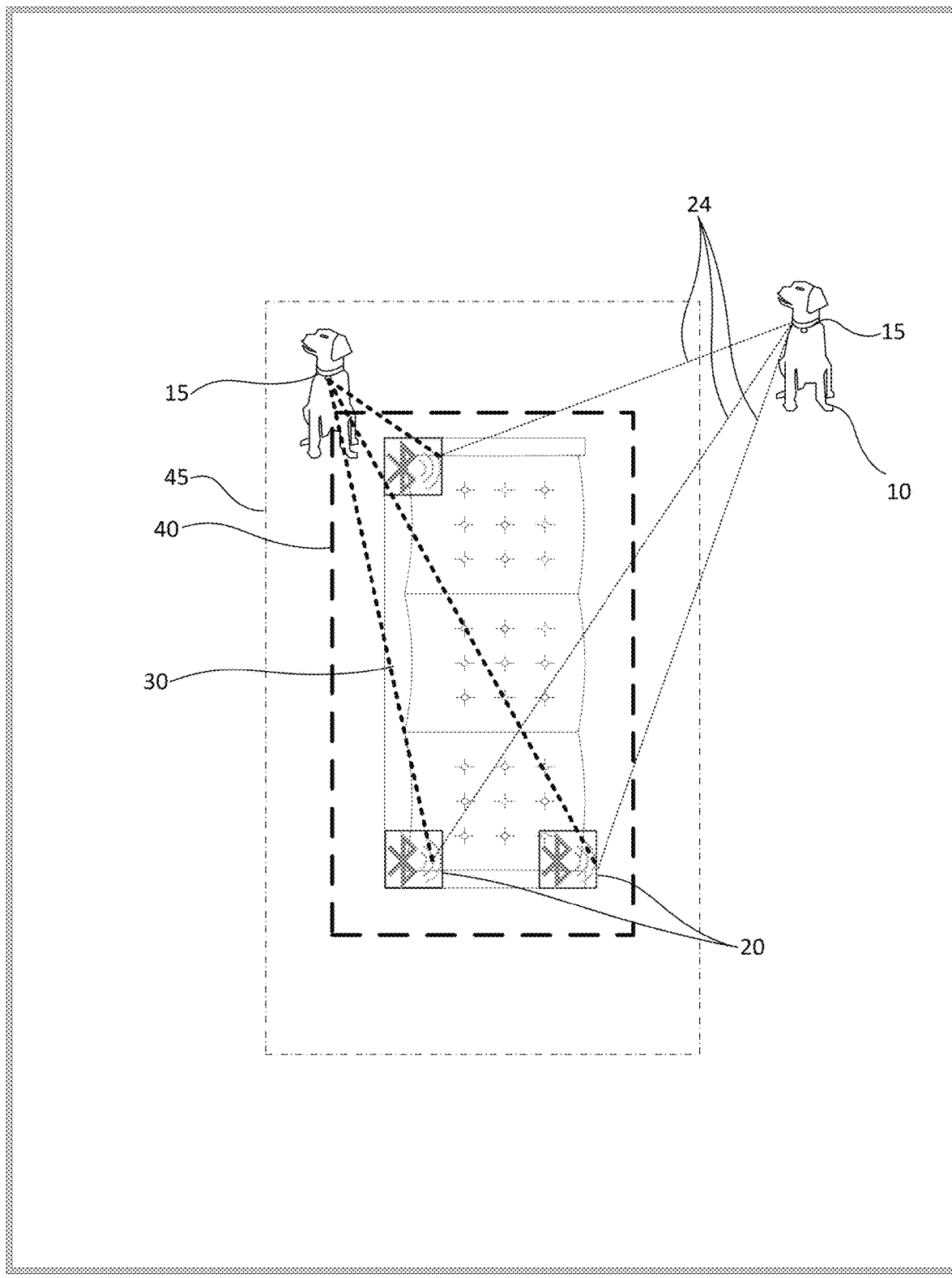
FIG. 4 illustrates an embodiment of utilizing 3 Bluetooth transmitters to help determine warning and prohibited zones to the smart collar.

FIG. 4 illustrates an arrangement that utilizes 3 Bluetooth transmitters to help form the prohibited 40 and warning zones 45 as they provide the necessary information to the smart collar 15 worn by the animal 10 animal respect to each of the zones.

Figure 5:
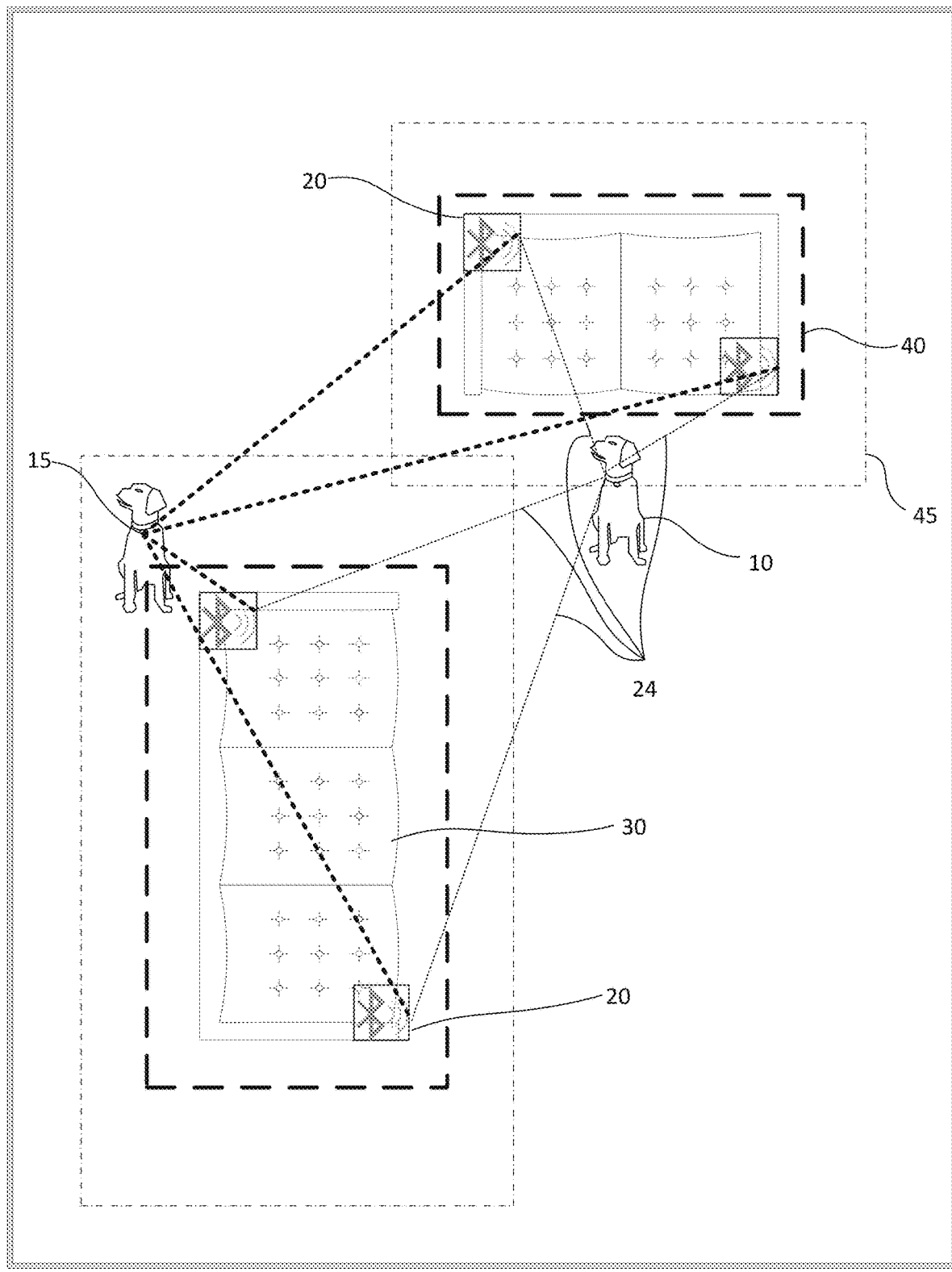
FIG. 5 illustrates an embodiment of utilizing 3 or more Bluetooth transmitters attached to multiple items to help determine warning and prohibited zones to the smart collar.

FIG. 5 illustrates another arrangement where some of the Bluetooth transmitters 20 are within the defined prohibited or warning zone, while other Bluetooth transmitters 20 are within a nearby prohibited zone, but their signal is strong enough that they can help form and provide data to the smart collar 15. In other words, the systems and methods described herein can utilize, as noted above, multiple transmitters to help determine and create various zones both from within the zone and outside of the zone. In the arrangement shown, the animal 10 can see up to 4 Bluetooth transmitters at a given time.

Figure 6A:
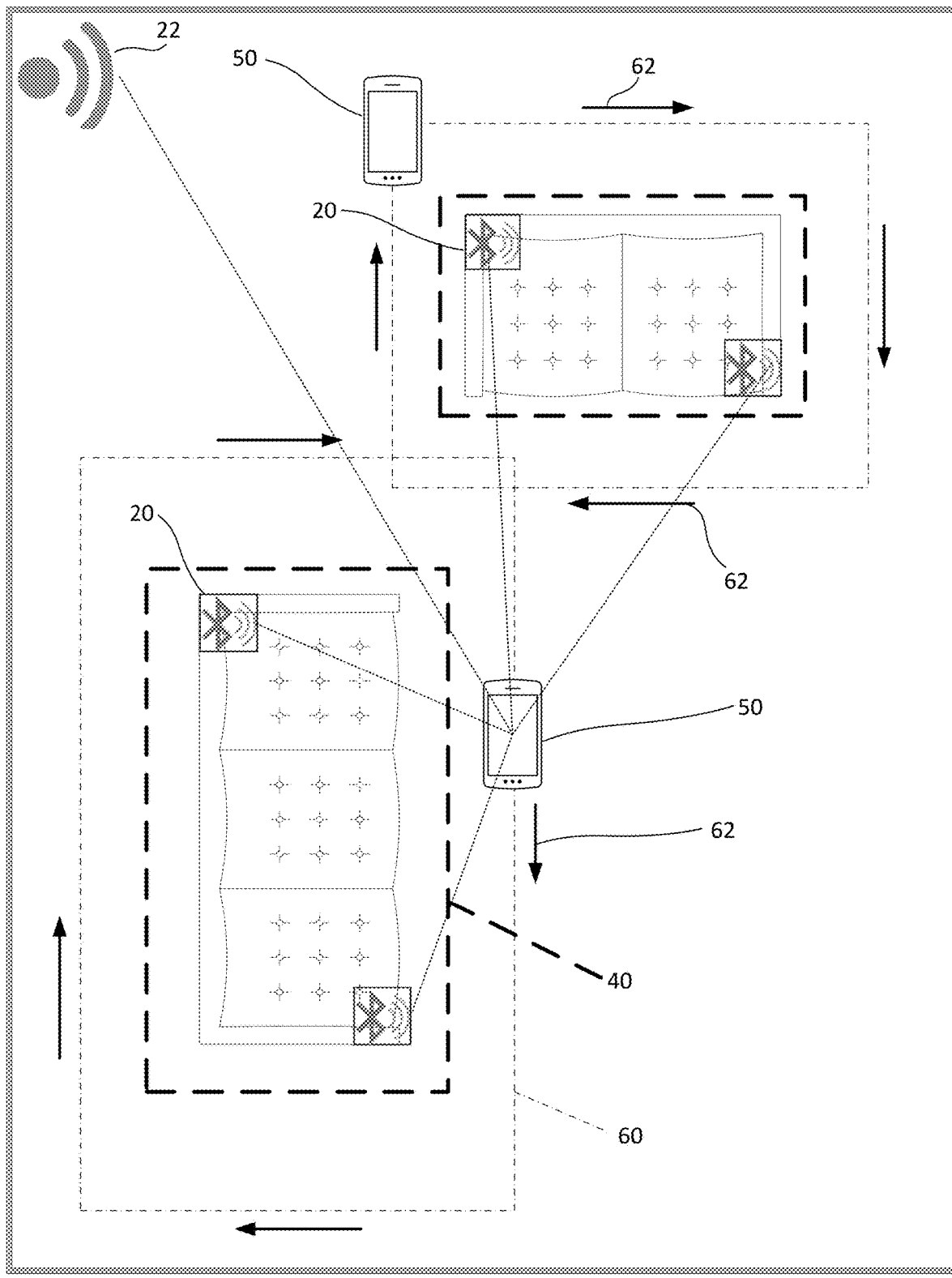
FIGS. 6A-B illustrates utilizing a smartphone or smart collar device to set up warning and prohibited zones for use with the smart collar.
Figure 6B:
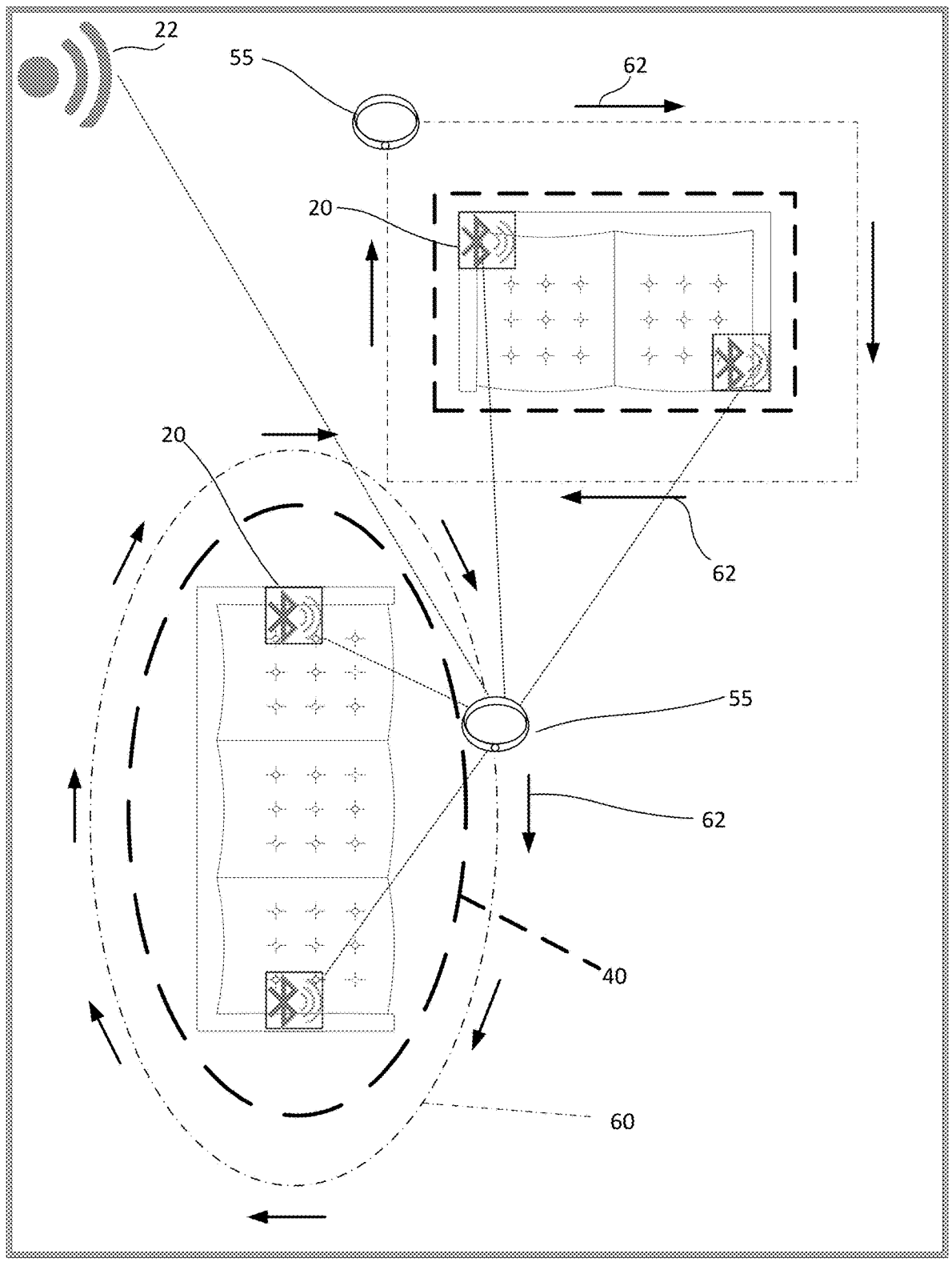

FIGS. 6A-B are illustrations showing how a user can initiate a set up program on a smartphone device 50 or smart collar 55 to create various zones. Once a user positions each Bluetooth transmitter 20 about each piece of furniture 30, the user can then create and name each particular zone, which can be designated a type including prohibited, warning, or open zone. As the user walks or travels 62 around the furniture 30 with their device (50, 55) to form an invisible zone 60, the strength of the signals from each transmitter (both Bluetooth 20 and WIFI signals 22 that are available) are recorded, as well as the unique identification of each Bluetooth transmitter (and WIFI emitter) is noted, so that they can be associated with a particular zone and input into a table (discussed below). The user can also designate whether each of the transmitters are disposed within or outside of the formed zone(s). The invisible zone 60 can either become the prohibited 40 or alternatively, the user can shrink or enlarge the zone. As shown in FIGS. 6A-B the invisible zone 60 that is created by traveling 62 around the furniture is larger than the finalized prohibited zone 40.

As the smartphone 50 or smart collar 55 reads each transmitter, a unique identifier is associated with each transmitter, the strength of the signal as the setup device changes positions is recorded and associated with each unique identifier. In some instances, the Bluetooth transmitters can be two-way transceivers, to both receive and transmit information. This two-way transceiver can allow the positioning to be configured using angles in addition to signal strength alone. Triangulation often uses at least three points, angles, direction and speed to determine the position of an object, while trilateration uses signal strength of at least three signals to determine where an object is. Although the present arrangements shown herein can track the collar, one of the main objects is to create invisible zones and determine whether the collar has entered the zone, or whether the collar is entering a warning zone associated with the prohibited zone, so that a stimulating device or notification associated with the collar can be triggered. It is not necessary to determine an exact location of the collar for the system to function properly.

In addition to being able to map out a 2-D region, the system can be configured for a 3-dimensional space. For example, in some instances the animals could be allowed to go around, below and underneath a kitchen table, but the moment a plane or space near or above say a table is breached the stimuli, training and other warning mechanisms are initiated. In other instances, a user may be okay with the animal on the bed, but not want the animal burrowing under the bed. For setting up a 3-dimensional zone, similar walking around the zone can be done, but an additional height component registry can be recorded.

An alternative way of setting up warning and prohibited zones includes placing a smartphone 50 and/or the smart collar 55 at specific points around the perimeter that defines each of the zones. At each point the smartphone and/or collar reads each of the emitted Bluetooth or WIFI signals and stores those signals in memory for each spot along the perimeter. Once each of the spots have been completed, the information stored in memory is then analyzed either locally on the smartphone or smart collar or transmitted to the cloud to be analyzed, where a zone is then created. That zone information is then stored locally on the collar and includes a set of rules of when to trigger stimuli, send notifications or trigger other features associated with the collar or devices communicating with the collar.

Figure 7A:
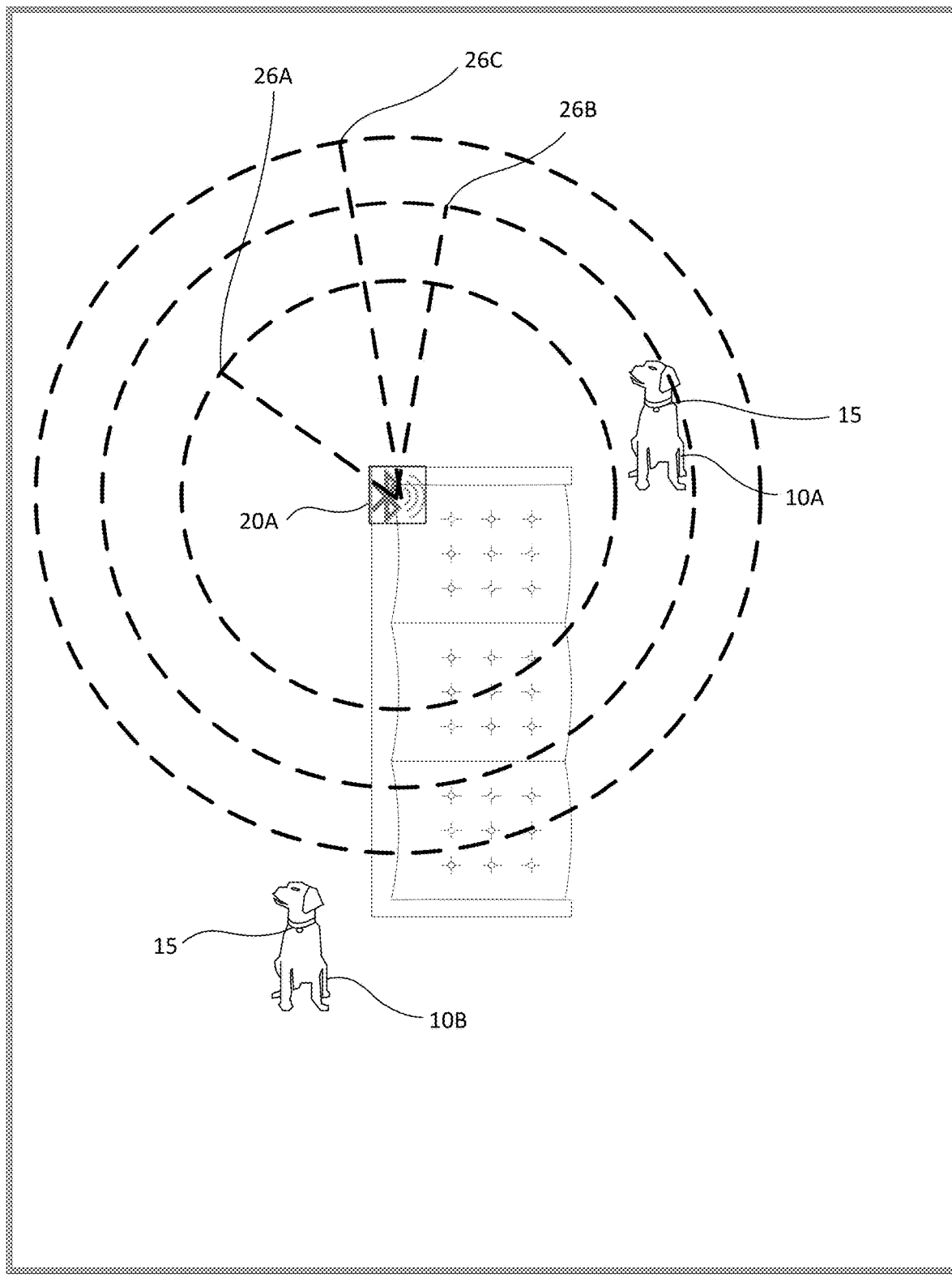
FIGS. 7A-C illustrate the deficiencies of using a single Bluetooth transmitter, and the benefits of utilizing multiple Bluetooth transmitters.
Figure 7B:
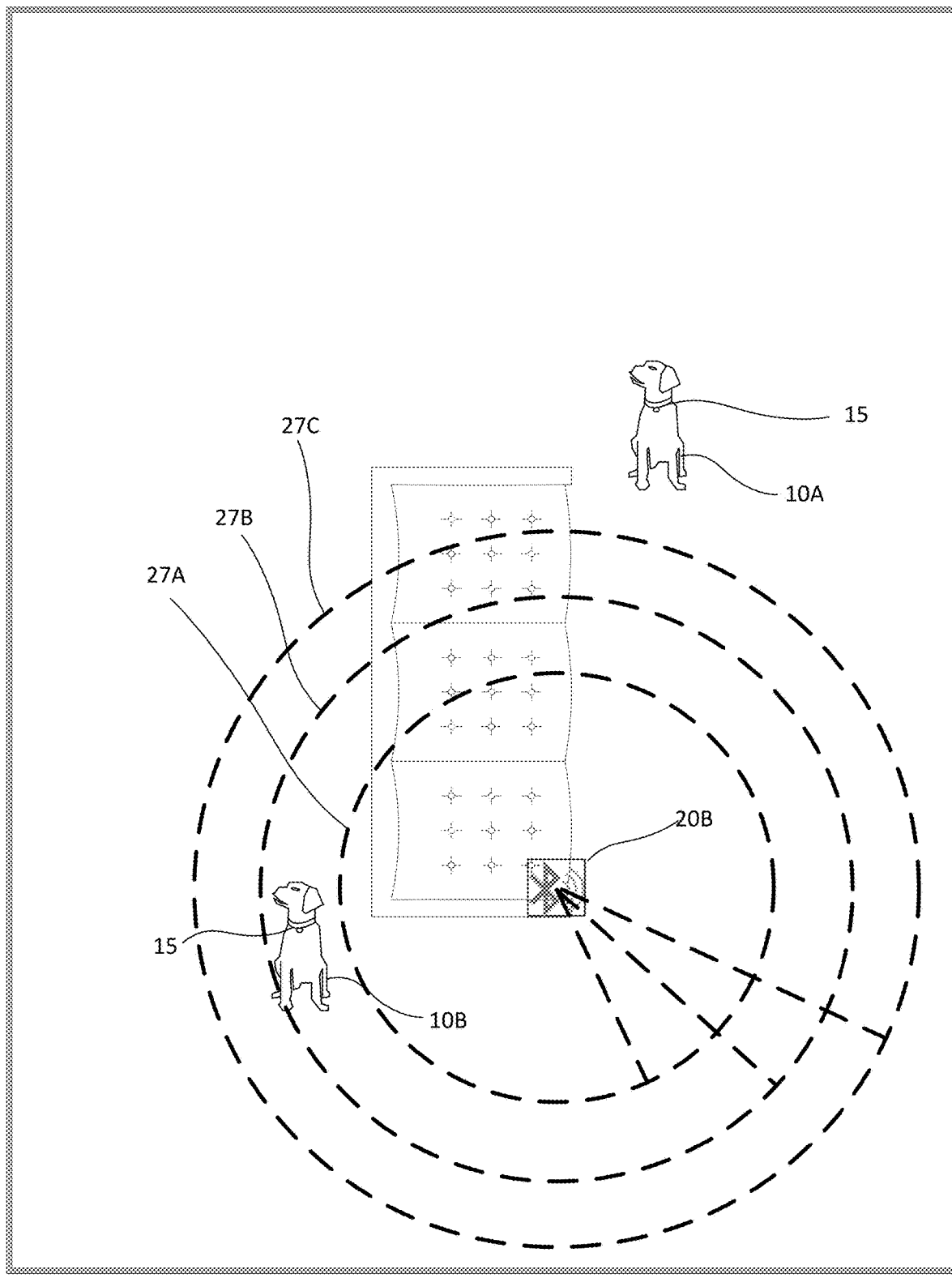
Figure 7C:
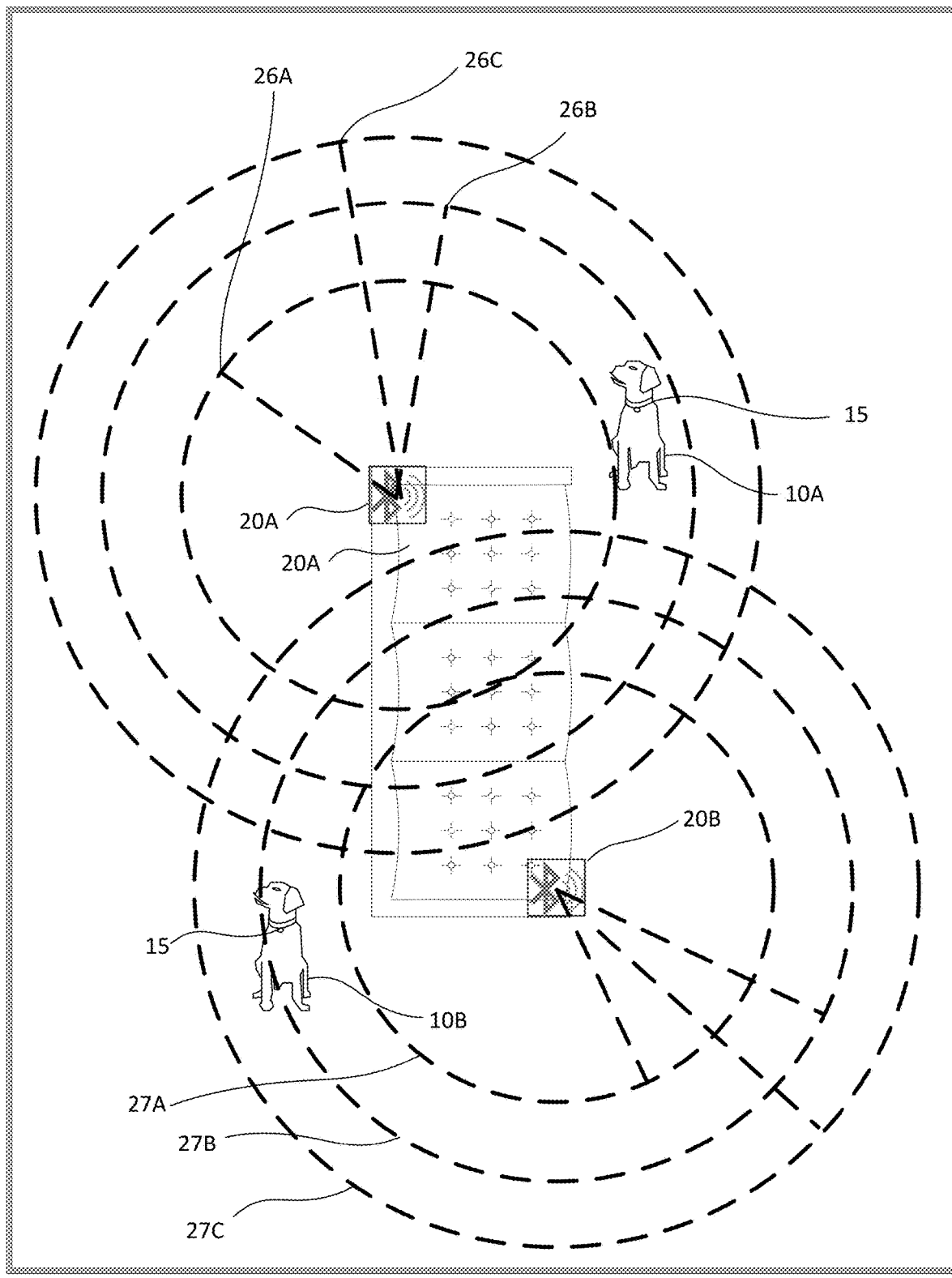

FIGS. 7A-C illustrate the deficiencies of using a single Bluetooth transmitter, and the benefits of utilizing multiple Bluetooth transmitters. For example, in FIG. 7A Bluetooth emitter 20B can emit a signal that at varying points away from the emitter decreases in intensity (or what is commonly known as signal strength). This decrease in signal strength is illustrated by concentric circles 26A, 26B, and 26C with the greater distance indicative of a weaker signal. Similarly, FIG. 7B illustrates an alternative Bluetooth Emitter 20B with associated strength signals illustrated by associated concentric circles 27A, 27B, and 27C again with the greater distance indicative of a weaker signal from 20B. In either FIG. 7A or 7B one can see that if there were only a single signal being emitted from 20A or 20B to create a prohibited zone, there could exist spots that either don't cover the anticipated or desired zone coverage, or alternatively there could be areas where the owner would like to allow animal 10A or 10B to be without triggering a correction stimulus. FIG. 7C illustrates how the overlapping of both Bluetooth emitter signals from 20A and 20B can be used to provide appropriate defined zone coverage as note in the earlier figures and above.

Figure 8A:
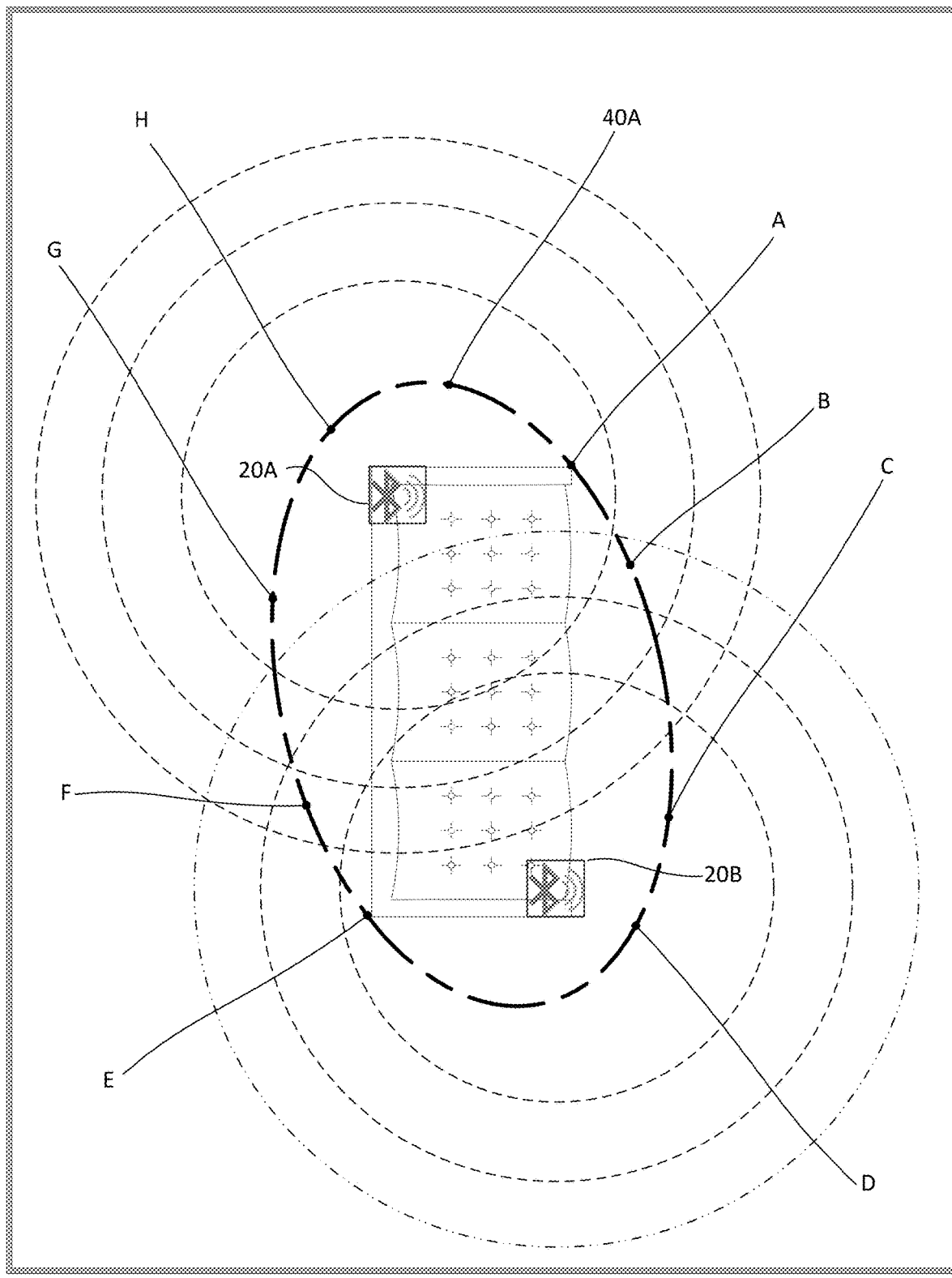

FIGS. 8A-B illustrate an example of signal strength for various points along a prohibited zone 40A from emitters 20A and 20B. Points A-H along prohibited zone 40A in FIG. 8A correspond to the table in FIG. 8B. The table in FIG. 8B is provided as an example base on an intensity scale of 1-10. As the collar or smartphone moves along the perimeter of the prohibited zone 40A the intensity from each emitter 20A and 20B changes. As noted above, this information can be analyzed and uploaded to a smart collar, so that the collar responds appropriately when determining whether or not the collar has entered the prohibited zone or not.

Figure 9A:
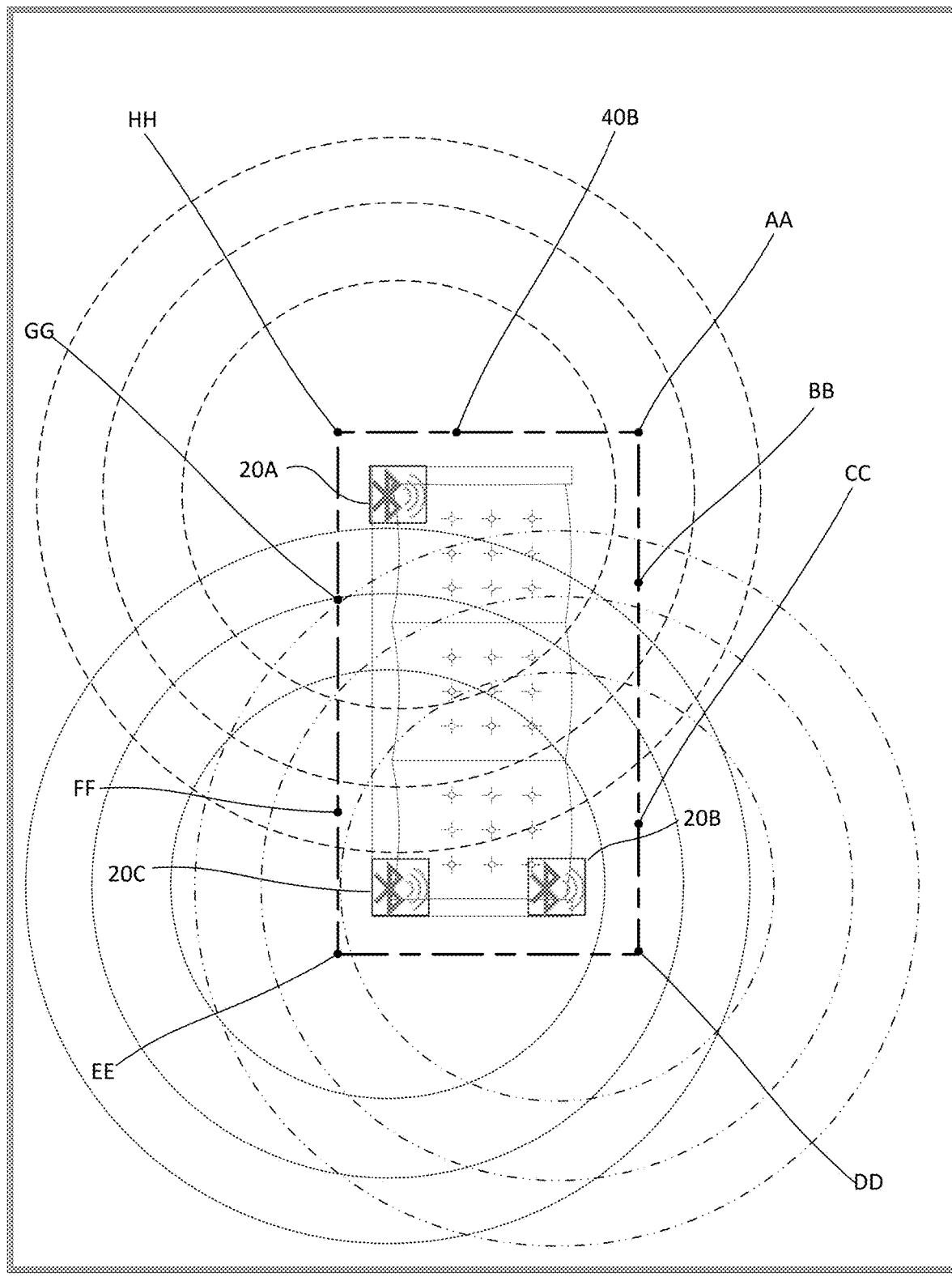

FIGS. 9A-B illustrate another example of mapping signal strength for various points into a table. As shown in FIG. 9A, three emitters 20A, 20B, and 20C are placed at various positions about a piece of furniture, where a desired prohibited zone 40B is formed around there. The prohibited zone 40B in FIG. 9A has more of rectangular shape. One of the advantages of having more than two emitters, is it is easier to form zone shapes with more distinct corner features like a rectangle. Various points AA-HH about the prohibited zone 40B have their corresponding signal strength mapped to the table shown in FIG. 9B. The table in FIG. 9B is provided as an example based on an intensity scale of 1-10. As the collar or smartphone moves along the perimeter of the prohibited zone 40B the intensity from each emitter 20A, 20B and 20C changes. Again, this information can be analyzed and uploaded to a smart collar, so that the collar responds appropriately when determining whether or not the collar has entered the prohibited zone or not. It should also be readily understood from these figures that WIFI signal strength could be a second, third or fourth emitter and tracked similarly to the Bluetooth emitters. Additional emitters help to refine the prohibited zone.

Figure 10:
FIG. 10 is flowchart of a method of creating a prohibited zone utilizing two or more Bluetooth transmitters.

FIG. 10 is flowchart of a method of creating a prohibited zone utilizing two or more Bluetooth transmitters (and/or additional WIFI emitters). As noted in part above, a user can place a first and second (and even third or more) Bluetooth emitter about an area where they are creating a particular zone. They can then associate each of those placed emitters with a particular zone, which can be created and named. The association step can include recording the unique identification number of each Bluetooth emitter with the created zone, such that when the collar sees a signal from an emitter, it can determine the relationship with regards to that particular zone. Once the emitters are placed and associated, the user can use either a smartphone, smart collar or other Bluetooth transceiving device to create a perimeter, as discussed above. The perimeter can be saved to a profile and uploaded to the smart collar that is to be worn by the pet.

By way of example one type of smart collar can include: a control system, the control system comprising: a non-transitory computer-readable medium containing a first set of computer-implemented instructions; a first set of processing circuitry operatively connected to the non-transitory computer-readable medium, the processing circuitry being configured to implement the first set of computer instructions; a first wireless transceiver; a collar being configured to be worn by an animal, the collar further comprising: a stimulus emitter; a second wireless transceiver configured to receive signals from the control system by means of a connection with the first wireless transceiver; a second set of processing circuitry, the processing circuitry being configured to receive commands from the control system and initiate or interrupt emission of one or more stimuli from the stimulus emitter at least one stimulus being a negative stimulus; and a first Bluetooth transceiver; and a second Bluetooth transceiver, the second Bluetooth transceiver being configured to be selectively paired and connected with the first Bluetooth transceiver, the second Bluetooth transceiver being configured to emit a reduced range signal such that the first Bluetooth transceiver and the second Bluetooth transceiver only connect when within a predefined threshold distance, wherein the second Bluetooth transceiver is configured to be placed in an animal restricted area; and wherein first set of computer-implemented instructions contains instructions to perform the following tasks: determine when a connection between the first Bluetooth transceiver and the second Bluetooth transceiver has been established thus signaling entrance of the animal into the animal restricted area; send a signal to the collar instructing the collar to initiate emission of the negative stimulus from the stimulus emitter.

The smart collar can couple with or be associated with a pet training and location system which can be utilized by a pet owner to train a pet to behave in a certain manner depending on the pet's particular location as determined by a collar being worn by the pet. The dog can be trained to stay in particular permitted areas and not enter restricted areas. In some instances, the restricted and permitted areas can be statically located, such in a yard, which is a permitted zone, as opposed to outside the yard, in a garden plot, or a flower bed, which can be defined as restricted zones. Inside a house open zones and prohibited zones, such as around furniture, can also be created.

In some instances, particularly when beginning training, it can be advantageous to provide negative stimulation, or negative reinforcement to discourage a pet from leaving the permitted zone and entering one or more restricted zones. However, in some instances, once a restricted zone has already been entered it can be important to cease providing negative reinforcement, and instead provide a positive stimulus or reinforcement to encourage the pet to return to the permitted zone. Additionally, in some instances, use of negative stimulus can be omitted altogether, and positive reinforcement used as the sole mechanism for training where permitted zones and prohibited zones exist.

It will be appreciated that permitted zones can be defined using various methods, either within a connectable distance as discussed above, or alternatively the system can be provided with a user portal or web app which can present an interactive map to the user. It will also be understood that the user portal can be presented to the user or interacted with by the user via an application on a mobile device or using an online web portal. The interactive map can then be utilized by the user to draw boundary lines on the map and define interior or exterior portions of the boundaries as restricted or permitted zones or enhance or enlarge boundaries created by the above methods of utilizing the smart phone or collar and a plurality of powered transceivers.

It will be appreciated that providing negative stimulus, such as through an electrode, and associated electric shock has been utilized in many previously known systems and is known as a relatively effective training method. However, one aspect of the present invention involves providing not only a negative stimulus for a negative behavior, but also allows for providing a positive stimulus for corrective behavior or desired behavior. In particular, one aspect of the present invention involves providing a positive stimulus when a pet moves from a restricted zone to a permitted zone, or does something else that the user deems as a positive behavior. In order to provide positive stimulus, the system as contemplated can also include an audio transmitter, such as a speaker, which can be configured to provide an audio stimulus in the audible range or at ultrasonic frequencies which can be heard by the pet, but not the owner/user. In such cases, the audio transmitter can be configured to provide an audio signal which can be either pleasing or unpleasant to the pet in response to determined behaviors. The audio transmitter can provide positively trained sounds or recordings when positive activities are determined. For example, the user could record an audio recording of their voice offering praise to the pet, then the audio recording can be played to the pet when the pet comes back into the permitted zone from a restricted zone. Thus, secondary sensor can be utilized to generate the positive reinforcement mechanisms associated with system and collar. Whereas sensor is utilized to trigger or generate the negative reinforcement mechanisms associated with system and collar.

It will be understood that the audible signal can be configured to be any number of sounds, any of which can be trained to be a positive reinforcement sound for the pet. For example, with professional dog trainers the trainer can use a clicker which makes a particular noise, and give the dog a treat whenever they produce the sound with the clicker. Similar methods can be used in the present invention, and virtually any given sound with a predetermined or trained response from the pet can be utilized for this positive reinforcement. In some embodiments, such sounds can include chimes, or an ultrasonic version of any of the other sounds discussed above.

Further, it will also be understood that the audio transmitter can also be used for negative reinforcement, rather than using electric shock. In such cases the user can record a verbal reprimand, or some other negative reinforcement noise so as to provide a more humane negative reinforcement over the electric shock and electrode methodology. It will be appreciated that the speaker can be utilized by the user/owner to provide positive verbal commands, reinforcement or feedback. Each of these functions can be automatically activated or alternatively manually activated via the mobile smart device of the owner/user using the control application.

It will also be understood that a power source, such as a battery, can be provided within collar which is configured to provide power to each of the aforementioned accessories, sensors, etc. The power source can be configured to be rechargeable either through a power port, or can incorporate wireless charging technology.

As discussed in some detail above, the system will include a user platform, such as an application, which can be configured to receive input from a user. It will be understood that the application/user platform can be accessed through mobile devices, web portals, or any number of suitable means. It will be understood that the platform is operable to define at least one permitted zone where the pet is permitted to reside and at least one restricted zone where the pet is restricted from entering. This can be achieved by defining or drawing boundaries as noted above.

Additionally, it will be understood that the collar can be provided with a local processing unit and non-transitory computer-readable media for tracking location or activities and saving data with regard to those activities locally. Such a local processor and non-transitory computer-readable media can store computer instructions wherein sounds, warnings, positive reinforcement, or negative reinforcement steps and when applied can each be determined locally and performed locally after transfer of such instructions from the user platform. Accordingly, the user platform can be connected to a remote server having a remote processor and non-transitory computer-readable media can be utilized remotely, and instructions can then be transmitted to the collar to perform any such step or action using a mobile or home network.

In some embodiments, as desired by the user, the positive reinforcement signal or audible signal can sound intermittently for the entire time that the dog remains within the specified range from the user to aid in training purposes. In this manner, when the pet is behaving well, and staying within the prescribed distance, the pet will get continuous positive reinforcement. Alternatively, the system can be configured to only offer the positive reinforcement when re-entering the prescribed threshold distance from an out-of-range situation.

The system can also include processing capabilities and data storage capabilities which allow for activities to be determined, stored, and enter a desired mode based on a predetermined set of instructions in response to input or commands from the various sensor or commands provided through the communication systems. In some instances, pet data can be transmitted and stored over an external network or service for data tracking of various pet activities, parameters, etc.

In yet additional embodiments the sensors in the pet collar can be utilized to interact with detectable secondary items, said secondary items can have active or passive sensors embedded within the secondary items. In yet additional embodiments the pet collar can have active transmitters, communication devices, or sensors which are capable of interacting with alternative receivers, transmitters, communication devices, or sensors provided in alternative items separate from the control application provided on a computer or smart device configured to control the collar.

In certain embodiments, the control application can be utilized to customize a collar response by registering each of the individual independent proximity sensors and saving a profile therefore which prompts specific stimuli based on the proximity thereto. For example, a sensor on a cat and a sensor on a dog can prompt a negative response to discourage the dog from chasing the cat.

In yet additional embodiments certain collar responses can be customized by a user using the control application, such as a custom recording including particular and customized praise(s)/reprimand(s) to be played back by the speaker based on a sensed proximity to a particular item or boundary.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

We claim:

1. An animal restricted zone system comprising:
    an animal-borne smart collar comprising:
        a non-transitory computer-readable medium containing a first set of computer-implemented instructions,
        a first set of processing circuitry operatively connected to the non-transitory computer-readable medium, the processing circuitry being configured to implement the first set of computer instructions,
        memory,
        a wireless transceiver,
        a stimulus emitter, and
        a power source; and
    a plurality of powered transceivers, each having a unique identification, a location, and is configured to emit a signal, and
    wherein the collar is configured to receive multiple emitted signals simultaneously and determine the signal strength of each signal, and
    wherein the processing circuitry is configured to utilize the determined signal strength of each signal to determine a distance relative to a pre-determined warning or prohibited zones, as defined by an associated table uploaded to memory,
    wherein at least one of the plurality of powered transceivers is used to define more than one prohibited zone,
    wherein each prohibited zone is created using the associated table having the signal strength of at least two or more of the plurality of powered transceivers at various mapped points about the perimeter of each prohibited zone,
    wherein at least one of the plurality of powered transceivers used to define a particular prohibited zone is positioned within the particular prohibited zone and at least one of the plurality of powered receivers used to define the particular prohibited zone is located outside the particular zone, and
    wherein a signal-strength detecting device is used to identify the signal strength of each of the plurality of powered transceivers associated about the perimeter of a particular prohibited zone and uploaded to the memory.

2. The animal restricted zone system of claim 1, wherein at least one of the powered transceivers is a Bluetooth transceiver.

3. The animal restricted zone system of claim 1, wherein at least one of the powered transceivers is a WIFI transceiver.

4. The animal restricted zone system of claim 1, wherein the plurality of powered transceivers includes at least one WIFI transceiver and one Bluetooth transceiver.

5. The animal restricted zone system of claim 1, wherein the plurality of powered transceivers includes three Bluetooth transceivers.

6. The animal restricted zone system of claim 5, wherein Bluetooth transceivers can only establish a connection within a range of 0-2 meters.

7. The animal restricted zone system of claim 1, wherein any stimulus emitted by the collar is interrupted when the connection between the plurality of power transceivers is lost.

8. An animal restricted zone system comprising:
    an animal-borne smart collar comprising:
        a non-transitory computer-readable medium containing a set of computer-implemented instructions,
        a set of processing circuitry operatively connected to the non-transitory computer-readable medium, the processing circuitry being configured to implement the set of computer instructions,
        a wireless transceiver,
        a stimulus device, and
        a power source; and
    at least two sets of Bluetooth emitters, each set having at least two emitters, each emitter having a unique identification, a location, and is configured to emit a signal, and
    wherein the smart collar or alternatively a smartphone is configured to receive multiple emitted signals simultaneously, determine the signal strength of each signal, and record the signal strength of each emitter at various points along a perimeter of at least two desired prohibited zones, wherein the recorded signal strength at the various points are used to create a separate table used for determining each of the desired prohibited zones that is stored in the smart collar, wherein the perimeter of the desired prohibited zones is not circular,
    wherein at least one emitter from the at least two sets of emitters is used in at least two different tables, and
    wherein the processing circuitry is configured to determine whether or not the smart collar has entered the desired prohibited zone using the stored table.

9. The animal restricted zone system of claim 8, further comprising: recording the signal strength of a WIFI emitting device at each of the various points along the perimeter of the prohibited zone and incorporating WIFI recorded signal strength into at least two of the tables.

10. The animal restricted zone system of claim 8, wherein the stimulus device of the smart collar includes any of the following: an electro-shocking device, a vibrating device, an audio emitting device, and a two-way communication system that includes sending and receiving audio between a user's smartphone to the collar.

11. The animal restricted zone system of claim 1, wherein the uploaded tables included a height registry component to establish a 3-dimensional prohibited zone.

12. A method of establishing an animal restricted zone around an area, the method comprising:

placing a first emitter at a first location outside of an animal restricted zone, wherein the first emitter emits a first signal;

placing a second emitter at a second location inside of the animal restricted zone, wherein the second emitter emits a second signal, wherein the first location is different than the second location;

utilizing a wireless communication device to establish a non-circular perimeter around the animal restricted zone by determining a signal strength of the first signal and a signal strength of the second signal, and wherein the utilization of a wireless communication device step includes recording a height component in addition to perimeter components, so as to create a 3-dimensional prohibited zone, wherein either the first emitter or the second emitter is associated with and used to create a second animal restricted zone; and uploading the established perimeter to a smart collar.

* * * * *